UNITED STATES PATENT OFFICE.

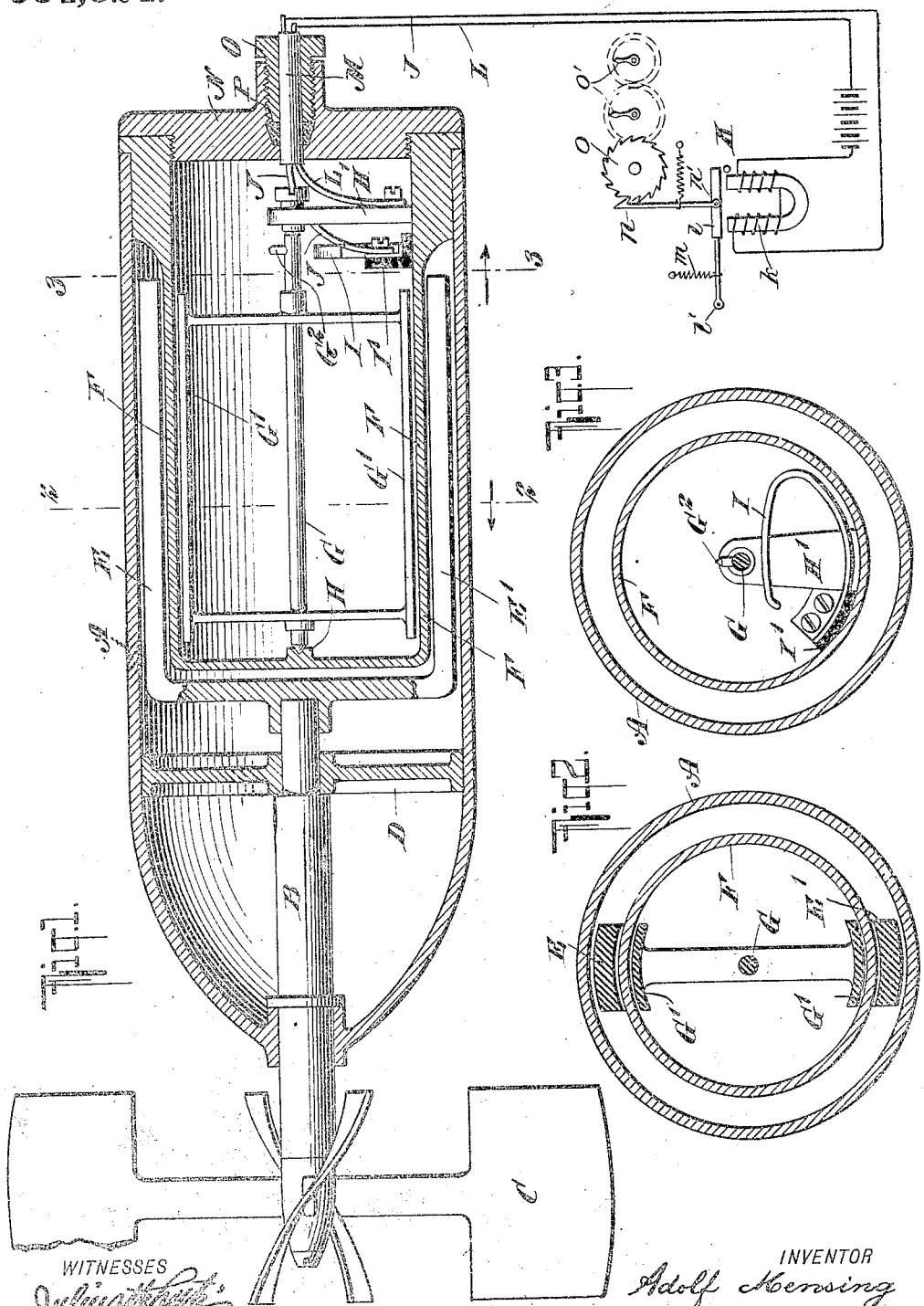

ADOLF MENSING, OF BERLIN, GERMANY.

SPEED-INDICATOR FOR SHIPS AND WATER-CURRENTS.

934,894.

Specification of Letters Patent. Patented Sept. 21, 1909.

Application filed July 12, 1906. Serial No. 325,824.

*To all whom it may concern:*

Be it known that I, ADOLF MENSING, a subject of the Emperor of Germany, and a resident of Berlin, Germany, have invented certain new and useful Improvements in Speed-Indicators for Ships and Water-Currents, of which the following is a specification.

My invention relates to devices for measuring the speed of ships or water-currents, and particularly such as embody an electric circuit-closer, and has for its object to provide an instrument of this description in which the circuit-closer will be inclosed so that it will be impossible for the water to contact therewith as the device is used.

Other objects of my invention will appear from the annexed description and the features of novelty will be pointed out in the appended claims.

Reference is to be had to the accompanying drawings in which—

Figure 1 is a sectional elevation of my improved speed-indicator; Fig. 2 is a cross section thereof on line 2—2 of Fig. 1 and Fig. 3 is a cross section thereof on line 3—3 of Fig. 1.

A is the outer casing which may be of any suitable construction and in which the shaft B is journaled, one end of which shaft in the present instance carries the usual propeller or screw device C. D is a bearing for the other end of said shaft B, to which end are secured magnets E, E' which rotate close to an inner casing F to which the outer casing A is rigidly secured. In this inner casing F which may be made of brass a shaft G is journaled in suitable bearings H, H', which shaft carries armature pieces G' of magnetizable material and is provided with a projection G² which acts in conjunction with a flat spring I as a circuit closing device. This flat spring I is secured to a support I' of non-conducting material and is connected by means of a wire J with an indicating device K which may be of any suitable construction. For instance, as indicated diagrammatically in Fig. 1, this device may consist of an electromagnet k controlling an armature l pivoted at l' and withdrawn from the magnet by a spring m. To the armature is pivoted at n' a pawl n, engaging a ratchet wheel o which, by means of a suitable train of gearing (not fully shown) operates the indicating hands or pointers o'. One end of a wire L is connected to the bearing H' of the shaft G, or to a flat spring permanently in contact with said shaft, the other end of said wire L being also suitably connected with said indicating device K. These wires J and L pass through a tube of insulating material M, for instance india-rubber, in a screw threaded cap N which screws into the inner casing F. A suitable screw sleeve O, receiving the tube M, screws into the cap N and compresses a conical rubber washer P so as to form a tight joint and prevent water from entering said inner casing F at the point where the wires J and L pass through the cap N. Thus the circuit-closer or circuit-controller is inclosed in a water-tight manner.

In operation, in the instance shown the device will be placed in the water and secured to the ship or to some stationary point, according to the use of the device as a ship's log or a current-indicator, by any suitable means, such as a cable containing one or more electric wires, such as for instance the wires J, L of the drawing. The indicating device K is on board the ship or on the land, or wherever the observer may be stationed. As the propeller C is turned by the action of the water, the shaft B will be rotated and with it the magnets E, E'. During this rotation of the shaft B and magnets E, E', the magnetic attraction will carry along the armature pieces G' and thus compel the shaft G to rotate with the shaft B. The magnets E, E', as well as the armature pieces G', extend lengthwise of the shafts B, G, and are preferably parallel thereto. The magnets E, E' straddle the casing F and embrace the armature pieces G', as clearly shown in Fig. 2, thus securing a very efficient magnetic attraction. As the shaft G is rotated, the projection G² will intermittently contact with the flat spring I, thus making and breaking the electrical circuit, the electrical impulses due to this making and breaking, operating in any suitable manner the indicating device K.

While water may enter the outer casing A at the point where the shaft B passes through it, such water cannot reach the shaft G, since the surrounding inner casing F protects said shaft and the circuit-closing device against the harmful action of water, and particularly salt water.

It is to be understood that while I have described the screw device C as attached directly to the shaft B, the said device C may be connected with said shaft by means of the usual torsion cord.

Various modifications may be made without departing from the nature of my invention as defined in the claims.

I claim:

1. A speed-indicator for ships and water-currents, comprising a water-tight casing, a shaft journaled therein, a circuit-controller located within said casing, means for operating the controller by a rotation of said shaft, an indicator, means for governing said indicator by the controller, a magnetic driving device comprising two rotary members of magnetizable material arranged in attractive relation and each consisting of a plurality of parts extending lengthwise of said shaft, one of said members being located within the casing and connected with said shaft, while the other member is located outside the casing and embraces it, and a device for rotating said exterior member.

2. A speed-indicator for ships and water-currents, comprising a water-tight casing, a shaft journaled therein, a circuit-controller located within said casing, means for operating the controller by a rotation of said shaft, an indicator, means for governing said indicator by the controller, a magnetic driving device comprising two rotary members of magnetizable material arranged in attractive relation and each consisting of a plurality of parts extending parallel to said shaft, one of said members being located within the casing and connected with said shaft, while the other member is located outside the casing and embraces the corresponding parts of the inner member, and a device for rotating said exterior member.

3. A speed indicator for ships and water-currents comprising a water-tight casing, a shaft journaled therein, an indicator, means for governing said indicator by the rotation of said shaft, a magnetic driving device comprising two rotary members of magnetizable material arranged in attractive relation and each extending lengthwise of said shaft, one of said members being located within the casing and connected with said shaft, while the other member is located outside the casing, and a device for rotating said exterior member.

4. A speed indicator for ships and water-currents comprising a water-tight casing, a shaft journaled therein, an indicator, means for governing said indicator by the rotation of said shaft, a magnetic driving device comprising two rotary members of magnetizable material arranged in attractive relation and each consisting of a plurality of parts extending lengthwise of said shaft, one of said members being located within the casing and connected with said shaft, while the other member is located outside the casing and embraces the casing as well as the corresponding parts of the inner member, and a device for rotating said exterior member.

5. A speed indicator for ships and water currents, comprising a casing, a watertight compartment therein, two shafts journaled within the casing in longitudinal alinement, one of said shafts projecting to the outside of the casing while the other shaft is entirely inclosed within said watertight compartment, a device for rotating the shaft which projects to the outside of the casing, a magnetic driving device comprising two rotary members of magnetic material connected with the respective shafts, an indicator, and means for governing said indicator by the rotation of the shaft which is entirely inclosed.

6. A speed indicator for ships and water currents comprising a casing, a watertight compartment therein, two shafts journaled within said casing in alinement with each other, means located exteriorly of the casing for rotating one of said shafts while the other shaft is entirely inclosed within said watertight compartment, a magnetic driving device comprising rotary members of magnetizable material secured to the respective shafts, a circuit controller located within the casing, means for operating said controller by the rotation of the shaft, an indicator and means for governing said indicator by the controller.

7. A speed indicator for ships and water currents, comprising a frame or casing having a compartment inclosed entirely by stationary watertight walls, a shaft journaled in said compartment and located entirely therein, a circuit-controller contained in said compartment, means for operating the controller by the rotation of said shaft, an indicator, means for governing said indicator by the controller, another shaft journaled in the casing and located entirely outside said compartment, a device for rotating said second shaft, and a magnetic driving device comprising two rotary members of magnetizable material connected with the said shafts respectively.

In testimony whereof I have hereunto signed my name in the presence of two subscribing witnesses.

ADOLF MENSING.

Witnesses:
WOLDEMAR HAUPT,
HENRY HASPER.